United States Patent
Sasaki et al.

(10) Patent No.: US 9,834,666 B2
(45) Date of Patent: *Dec. 5, 2017

(54) POLYOLEFIN-BASED RESIN COMPOSITION AND MOLDED BODY

(71) Applicants: KURARAY CO., LTD., Kurashiki-shi (JP); AMYRIS, INC., Emeryville, CA (US)

(72) Inventors: Hiromitsu Sasaki, Kamisu (JP); Yosuke Uehara, Kamisu (JP); Shota Suzuki, Kamisu (JP)

(73) Assignees: KURARAY CO., LTD., Kurashiki-shi (JP); AMYRIS, INC., Emeryville, CA (US)

(*) Notice: Subject to any disclaimer, the term of this patent is extended or adjusted under 35 U.S.C. 154(b) by 19 days.

This patent is subject to a terminal disclaimer.

(21) Appl. No.: 14/888,003

(22) PCT Filed: Sep. 29, 2014

(86) PCT No.: PCT/JP2014/075967
§ 371 (c)(1),
(2) Date: Oct. 29, 2015

(87) PCT Pub. No.: WO2015/046544
PCT Pub. Date: Apr. 2, 2015

(65) Prior Publication Data
US 2016/0297956 A1 Oct. 13, 2016

(30) Foreign Application Priority Data
Sep. 30, 2013 (JP) .................................. 2013-205575
Mar. 28, 2014 (JP) .................................. 2014-069099

(51) Int. Cl.
C08L 53/02 (2006.01)
C08L 23/12 (2006.01)
C08F 8/04 (2006.01)
C08F 297/04 (2006.01)
C08L 23/00 (2006.01)

(52) U.S. Cl.
CPC .............. *C08L 23/12* (2013.01); *C08F 8/04* (2013.01); *C08F 297/04* (2013.01); *C08L 23/00* (2013.01); *C08L 53/025* (2013.01); *C08L 2205/06* (2013.01)

(58) Field of Classification Search
CPC ......... C08L 23/12; C08L 53/025; C08L 23/04
See application file for complete search history.

(56) References Cited

U.S. PATENT DOCUMENTS

| 3,994,868 | A | * | 11/1976 | Inomata | C08F 8/04 |
| | | | | | 525/338 |
| 4,207,409 | A | * | 6/1980 | Ladenberger | C08F 8/04 |
| | | | | | 525/338 |
| 5,859,176 | A | * | 1/1999 | Nakahashi | C08L 71/123 |
| | | | | | 524/186 |
| 7,655,739 | B1 | | 2/2010 | McPhee et al. | |
| 7,759,444 | B1 | | 7/2010 | McPhee | |
| 2010/0056714 | A1 | * | 3/2010 | McPhee | C08C 19/02 |
| | | | | | 524/579 |
| 2011/0245405 | A1 | | 10/2011 | Jogo et al. | |
| 2012/0165474 | A1 | | 6/2012 | McPhee et al. | |
| 2012/0244304 | A1 | | 9/2012 | McPhee | |
| 2013/0123379 | A1 | | 5/2013 | McPhee | |
| 2016/0053144 | A1 | | 2/2016 | Sasaki et al. | |
| 2016/0108228 | A1 | * | 4/2016 | Sasaki | C08F 297/04 |
| | | | | | 524/505 |

FOREIGN PATENT DOCUMENTS

| CN | 102137879 A | 7/2011 |
| CN | 102203145 A | 9/2011 |
| CN | 103052664 A | 4/2013 |
| CN | 105308139 A | 2/2016 |
| EP | 2 431 417 A1 | 3/2012 |

(Continued)

OTHER PUBLICATIONS

Sasaki et al.,CAPLUS AN 2015:565896, Apr. 2015.*
Office Action dated Mar. 4, 2016 in Korean Patent Application No. 10-2015-7031138.
Combined Taiwanese Office Action and Search Report dated Dec. 4, 2015 in Patent Application No. 103133850 (with English translation of categories of cited documents).
International Search Report dated Dec. 2, 2014 in PCT/JP14/075967 Filed Sep. 29, 2014.
Combined Chinese Office Action and Search Report dated May 11, 2016 Patent Application No. 201480031015.2 (with English translation of categories of cited documents).

*Primary Examiner* — Jeffrey Mullis
(74) *Attorney, Agent, or Firm* — Oblon, McClelland, Maier & Neustadt, L.L.P.

(57) ABSTRACT

Provided is a polyolefin-based resin composition including a hydrogenated block copolymer (A) and a polyolefin-based resin (B), the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (b1) derived from farnesene and 99 to 0% by mass of a constitutional unit (b2) derived from a conjugated diene other than farnesene; a mass ratio of the polymer block (a) and the polymer block (b) [(a)/(b)] being 1/99 to 55/45; 50 mol % or more of carbon-carbon double bonds in the polymer block (b) being hydrogenated; and a mass ratio of the polyolefin-based resin (B) and the hydrogenated block copolymer (A) [{polyolefin-based resin (B)}/{hydrogenated block copolymer (A)}] being 1/99 to 99/1. The polyolefin-based resin composition is favorable in flexibility and molding processability, excellent in weather resistance and whitening resistance, and also excellent in rigidity.

11 Claims, No Drawings

(56) References Cited

FOREIGN PATENT DOCUMENTS

| | | |
|---|---|---|
| JP | 4-170452 A | 6/1992 |
| JP | 6-32947 A | 2/1994 |
| JP | 2000-219781 A | 8/2000 |
| JP | 2012-502135 A | 1/2012 |
| JP | 2012-502136 A | 1/2012 |
| JP | 2013-532767 A | 8/2013 |
| TW | I325480 B | 6/2010 |
| TW | 201026773 A1 | 7/2010 |
| WO | WO 2010/027464 A1 | 3/2010 |
| WO | WO 2010/131559 A1 | 11/2010 |
| WO | 2013-126129 A1 | 8/2013 |
| WO | 2013/183570 A1 | 12/2013 |
| WO | 2014/142001 A1 | 9/2014 |
| WO | 2014/156651 A1 | 10/2014 |

* cited by examiner

POLYOLEFIN-BASED RESIN COMPOSITION AND MOLDED BODY

TECHNICAL FIELD

The present invention relates to a polyolefin-based resin composition including a hydrogenated block copolymer containing a monomer unit derived from an aromatic vinyl compound and a polyolefin-based resin and to a molded body including the polyolefin-based resin composition.

BACKGROUND ART

Polyolefin-based resins are generally excellent in chemical resistance and mechanical properties and are used in wide areas including mechanical components, automobile components, household articles, various containers, and the like. In addition, for the purpose of modifying polyolefin-based resins, there have been made a large number of attempts to compound a polyolefin-based resin with a hydrogenated product of a block copolymer composed of styrene and a conjugated diene.

For example, PTL 1 describes a composition in which a polypropylene-based resin is compounded with two kinds of hydrogenated products of styrene-butadiene-styrene block copolymers (styrene-ethylene butylene-styrene block copolymers) having a different styrene content from each other and an inorganic filler, as a composition that is excellent in impact resistance, flow ability, and the like.

In addition, PTL 2 describes a composition in which a polypropylene-based resin is compounded with two kinds of hydrogenated products of styrene-conjugated diene block copolymers having a different vinyl bond content from each other, as a composition that is excellent in impact resistance and heat deformation resistance. Incidentally, in JP H06-32947A, the composition specifically disclosed in the working examples is limited to one containing, as a constitutional component, a hydrogenated product of a styrene-conjugated diene block copolymer using butadiene alone as the conjugated diene.

Furthermore, PTL 3 describes a polyolefin-based resin composition containing a polyolefin-based resin and a block copolymer having a block constituted of a vinyl aromatic compound and a block composed of isoprene and butadiene in prescribed proportions, for the purpose of providing a polyolefin-based resin composition that is excellent in tensile elongation and also well balanced with respect to impact resistance, rigidity, and the like.

Incidentally, though PTLs 4 and 5 describe a polymer of β-farnesene, practically useful physical properties thereof are not sufficiently studied.

CITATION LIST

Patent Literature

PTL 1: JP H04-170452A
PTL 2: JP H06-32947A
PTL 3: JP 2000-219781A
PTL 4: JP 2012-502135A
PTL 5: JP 2012-502136A

SUMMARY OF INVENTION

Technical Problem

Although the polyolefin-based resin compositions disclosed in PTLs 1 to 3 are excellent in at least one of flexibility, molding processability (flow ability), and weather resistance (heat deformation resistance), they are still insufficient. In addition, any study with respect to whitening resistance at folding is not made.

Then, an object of the present invention is to provide a polyolefin-based resin composition that is favorable in flexibility and molding processability, excellent in weather resistance and whitening resistance, and also excellent in rigidity and a molded body including the polyolefin-based resin composition.

Solution to Problem

Specifically, the present invention is concerned with:
[1] A polyolefin-based resin composition including a hydrogenated block copolymer (A) and a polyolefin-based resin (B),
the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (31) derived from farnesene and 99 to 0% by mass of a constitutional unit (b2) derived from a conjugated diene other than farnesene,
a mass ratio of the polymer block (a) and the polymer block (b) [(a)/(b)] being 1/99 to 55/45,
50 mol % or more of carbon-carbon double bonds in the polymer block (b) being hydrogenated, and
a mass ratio of the polyolefin-based resin (B) and the hydrogenated block copolymer (A) [{polyolefin-based resin (B)}/{hydrogenated block copolymer W}] being 1/99 to 99/1,
[2] A molded body including the aforementioned polyolefin-based resin composition, and
[3] A composite molded body including the aforementioned polyolefin-based resin composition and at least one of a dynamic crosslinking type olefin-based thermoplastic elastomer and a vulcanized rubber.

Advantageous Effects of Invention

In accordance with the present invention, it is possible to provide a polyolefin-based resin composition that is favorable in flexibility and molding processability, excellent in weather resistance and whitening resistance, and also excellent in rigidity and a molded body including the polyolefin-based resin composition.

DESCRIPTION OF EMBODIMENTS

[1] Polyolefin-Based Resin Composition

The polyolefin-based resin composition of the present invention is a polyolefin-based resin composition including a hydrogenated block copolymer (A) and a polyolefin-based resin (B),
the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (31) derived from farnesene and 99 to 0% by mass of a constitutional unit (b2) derived from a conjugated diene other than farnesene,
a mass ratio of the polymer block (a) and the polymer block (b) [(a)/(b)] being 1/99 to 55/45,
50 mol % or more of carbon-carbon double bonds in the polymer block (b) being hydrogenated, and a mass ratio of the polyolefin-based resin (B) and the hydrogenated block copolymer (A) [{polyolefin-based resin (B)}/{hydrogenated block copolymer (A)}] being 1/99 to 99/1.

[Hydrogenated Block Copolymer (A)]

The hydrogenated block copolymer (A) is a hydrogenated product of a block copolymer (hereinafter also referred to as "block copolymer (P)") including a polymer block (a) composed of a constitutional unit derived from an aromatic vinyl compound and a polymer block (b) containing 1 to 100% by mass of a constitutional unit (b1) derived from farnesene and 99 to 0% by mass of a constitutional unit (b2) derived from a conjugated diene other than farnesene in a mass ratio of the polymer block (a) and the polymer block (b) [(a)/(b)] of 1/99 to 55/45 (the hydrogenated product will be hereinafter also referred to as "hydrogenated block copolymer (A)"), in which 50 mol % or more of carbon-carbon double bonds in the polymer block (b) are hydrogenated.

The polymer block (a) is constituted of a constitutional unit derived from an aromatic vinyl compound. Examples of such an aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, divinylbenzene, and the like. These aromatic vinyl compounds may be used alone or in combination of any two or more thereof. Of those, styrene, α-methylstyrene, and 4-methylstyrene are more preferred, and styrene is still more preferred.

The polymer block (b) contains 1 to 100% by mass of the constitutional unit (b1) derived from farnesene and contains 99 to 0% by mass of the constitutional unit (b2) derived from a conjugated diene other than farnesene. Although the constitutional unit (b1) may be a constitutional unit derived from α-farnesene or β-farnesene represented by the following formula (I), the constitutional unit (b1) is preferably a constitutional unit derived from β-farnesene from the viewpoint of facilitating production of the block copolymer (P). Incidentally, α-farnesene and β-farnesene may be used in combination.

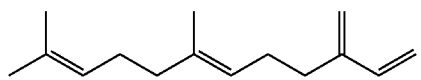
(I)

Examples of the conjugated diene constituting the constitutional unit (b2) derived from a conjugated diene other than farnesene include butadiene, isoprene, 2,3-dimethylbutadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, chloroprene, and the like. These conjugated dienes may be used alone or in combination of any two or more thereof. Of those, butadiene, isoprene, and myrcene are more preferred, and one kind or two kinds of butadiene and isoprene are still more preferred.

The polymer block (b) contains 1 to 100% by mass of the constitutional unit (b1) derived from farnesene and contains 99 to 0% by mass of the constitutional unit (b2) derived from a conjugated diene other than farnesene. Incidentally, it is meant by the terms "contains 0% by mass of the constitutional unit (b2) derived from a conjugated diene" that the polymer block (b) does not contain the constitutional unit (b2) derived from a conjugated diene. When the content of the constitutional unit (b1) derived from farnesene is less than 1% by mass, the molding processability and the whitening resistance of the polyolefin-based resin composition are lowered. The content of the constitutional unit (b1) in the polymer block (b) is preferably 30 to 100% by mass, and more preferably 45 to 100% by mass. In addition, in the case where the polymer block (b) contains the constitutional unit (b2) derived from a conjugated diene other than farnesene, the content of the constitutional unit (b2) is preferably 70% by mass or less, and more preferably 55% by mass or less.

The polymer block (b) may contain a constitutional unit other than the constitutional units (b1) and (b2) within the range where the effects of the present invention are not hindered; however, it is preferred that the polymer block (b) does not contain such other constitutional unit. A total amount of the constitutional unit (b1) and the constitutional unit (b2) in the polymer block (b) is preferably 95% by mass or more, and more preferably 100% by mass.

The hydrogenated block copolymer (A) is a hydrogenated product of the block copolymer (P) including at least one of each of the polymer block (a) and the polymer block (b). The hydrogenated block copolymer (A) is preferably a hydrogenated product of the block copolymer (P) including two or more of the polymer block (a) and one or more of the polymer block (b).

A bonding configuration of each of the polymer block (a) and the polymer block (b) is not particularly limited, and may be any one of a linear configuration, a branched configuration, a radial configuration, or a combination of any two or more of these configurations. Above all, a configuration in which the respective blocks are bonded in a linear configuration is preferred. When the polymer block (a) and the polymer block (b) are represented by a and b, respectively, a bonding configuration represented by $(a-b)_l$, $a-(b-a)_m$, or $b-(a-b)_n$ is preferred. Incidentally, each of l, m, and n independently represents an integer of 1 or more.

As for the binding configuration, a tri-block copolymer represented by a-b-a is preferred from the viewpoints of molding processability, weather resistance, whitening resistance, handling properties, and the like.

In addition, in the case where the block copolymer (P) has two or more of the polymer block (a) or two or more of the polymer block (b), each of the polymer blocks may be either a polymer block composed of the same constitutional unit or a polymer block composed of different kinds of constitutional units. For example, in the two polymer blocks (a) in the tri-block copolymer represented by [a-b-a], the respective aromatic vinyl compounds may be constituted of either the same kind of compound or different kinds of compounds.

A mass ratio of the polymer block (a) and the polymer block (b) [(a)/(b)] in the block copolymer (P) is 1/99 to 55/45. When the mass ratio falls outside the foregoing range, a polyolefin-based resin composition that is favorable in flexibility and molding processability and excellent in weather resistance and whitening resistance cannot be obtained. From those viewpoints, the mass ratio of the polymer block (a) and the polymer block (b) [(a)/(b)] is preferably 10/90 to 55/45, more preferably 10/90 to 45/55, still more preferably 15/85 to 45/55, and most preferably 15/85 to 40/60.

A peak top molecular weight (Mp) of the hydrogenated block copolymer (A) is preferably 4,000 to 1,500,000, more preferably 9,000 to 1,200,000, still more preferably 50,000 to 1,000,000, and most preferably 70,000 to 600,000 from the viewpoint of molding processability.

Incidentally, the peak top molecular weight (Mp) in the present specification means a value measured by the method described in Examples as described later.

A molecular weight distribution (Mw/Mn) of the hydrogenated block copolymer (A) is preferably 1 to 4, more preferably 1 to 3, and still more preferably 1 to 2. So far as the molecular weight distribution falls within the foregoing range, a scattering in a viscosity of the hydrogenated block copolymer (A) is small, and the handling is easy.

The block copolymer (P) may include, in addition to the polymer block (a) and the polymer block (b) as described above, a polymer block (c) constituted of other monomer, so long as the effects of the present invention are not hindered.

Examples of such other monomer include unsaturated hydrocarbon compounds, such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc.; functional group-containing unsaturated compounds, such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-methacrylamide-2-methylpropanesulfonic acid, vinylsulfonic acid, vinyl acetate, methyl vinyl ether, etc.; and the like. These monomers may be used alone or in combination of any two or more thereof.

In the case where the block copolymer (P) has the polymer block (c), its content is preferably 50% by mass or less, more preferably 40% by mass or less, still more preferably 30% by mass or less, and most preferably 10% by mass or less.

[Production Method of Hydrogenated Block Copolymer (A)]

The hydrogenated block copolymer (A) may be, for example, suitably produced by a polymerization step of obtaining the block copolymer (P) by anionic polymerization; and a step of hydrogenating 50 mol % or more of carbon-carbon double bonds in the polymer block (b) in the block copolymer (P).

<Polymerization Step>

The block copolymer (P) may be produced by a solution polymerization method or methods described in JP 2012-502135A and JP 2012-502136A, or the like. Above all, the solution polymerization method is preferred, and known methods, for example, ionic polymerization methods, such as anionic polymerization, cationic polymerization, etc., a radical polymerization method, and the like are applicable. Above all, the anionic polymerization method is preferred. As for the anionic polymerization method, the aromatic vinyl compound and farnesene and/or the conjugated diene other than farnesene are successively added in the presence of a solvent and an anionic polymerization initiator, and optionally a Lewis base, thereby obtaining the block copolymer (P).

Examples of the anionic polymerization initiator include alkali metals, such as lithium, sodium, potassium, etc.; alkaline earth metals, such as beryllium, magnesium, calcium, strontium, barium, etc.; lanthanoid-based rare earth metals, such as lanthanum, neodymium, etc.; compounds containing the aforementioned alkali metal, alkaline earth metal, or lanthanoid-based rare earth metal; and the like. Above all, alkali metals and compounds containing an alkali metal are preferred, and organic alkali metal compounds are more preferred.

Examples of the organic alkali metal compound include organic lithium compounds, such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, 1,3,5-trilithiobenzene, etc.; sodium naphthalene; potassium naphthalene; and the like. Above all, organic lithium compounds are preferred, n-butyllithium and sec-butyllithium are more preferred, and sec-butyllithium is especially preferred. Incidentally, the organic alkali metal compound may be allowed to react with a secondary amine, such as diisopropylamine, dibutylamine, dihexylamine, dibenzylamine, etc. and used as an organic alkali metal amide.

Although an amount of the organic alkali metal compound that is used for the polymerization varies depending upon a molecular weight of the block copolymer (P), it is typically in the range of from 0.01 to 3% by mass on the basis of a total amount of the aromatic vinyl compound, the farnesene, and the conjugated diene other than farnesene.

The solvent is not particularly limited so long as it does not adversely affect the anionic polymerization reaction, and examples thereof include saturated aliphatic hydrocarbons, such as n-pentane, isopentane, n-hexane, n-heptane, isooctane, etc.; saturated alicyclic hydrocarbons, such as cyclopentane, cyclohexane, methylcyclopentane, etc.; aromatic hydrocarbons, such as benzene, toluene, xylene, etc.; and the like. These solvents may be used alone or in combination of any two or more thereof. An amount of the solvent used is not particularly limited.

The Lewis base acts for controlling a microstructure of each of the constitutional unit derived from farnesene and the constitutional unit derived from a conjugated diene other than farnesene. Examples of such a Lewis base include ether compounds, such as dibutyl ether, diethyl ether, tetrahydrofuran, dioxane, ethylene glycol diethyl ether, etc.; pyridine; tertiary amines, such as N,N,N',N'-tetramethylethylenediamine, trimethylamine, etc.; alkali metal alkoxides, such as potassium t-butoxide, etc.; phosphine compounds; and the like. In the case of using the Lewis base, it is preferred that its amount is typically in the range of from 0.01 to 1,000 mol equivalent on the basis of 1 mol of the anionic polymerization initiator.

A temperature of the polymerization reaction is in the range of typically from −80 to 150° C., preferably from 0 to 100° C., and more preferably from 10 to 90° C. The mode of the polymerization reaction may be either a batchwise mode or a continuous mode. By supplying the aromatic vinyl compound, and the farnesene and/or the conjugated diene other than farnesene into the polymerization reaction solution in a continuous or intermittent manner such that the abundance ratio of each of the monomers falls within a specified range, or successively polymerizing the respective monomers such that each of the monomers in the polymerization reaction solution becomes a specified ratio, the block copolymer (P) may be produced.

The polymerization reaction may be stopped by adding an alcohol, such as methanol, isopropanol, etc., as a polymerization terminator. The resulting polymerization reaction solution may be poured into a poor solvent, such as methanol, etc., to precipitate the block copolymer (P). Alternatively, when the polymerization reaction solution is rinsed with water, separated, and then dried, the block copolymer (P) may be isolated.

In the present polymerization step, the block copolymer (P) in an unmodified form may be obtained as described above; however, by introducing a functional group into the aforementioned block copolymer (P) prior to a hydrogenation step as described later, the block copolymer (P) in a modified form may be obtained. Examples of a functional group that may be introduced include an amino group, an alkoxysilyl group, a hydroxyl group, an epoxy group, a carboxyl group, a carbonyl group, a mercapto group, an isocyanate group, an acid anhydride group, and the like.

Examples of the method of modifying the block copolymer (P) include a method in which before adding the polymerization terminator, a modifier capable of reacting with a polymerization-active terminal, such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, 4,4'-bis(diethylamino)benzophenone, N-vinylpyrrolidone, etc., or other modifier as described in JP 2011-132298A, is added. In addition, the isolated copolymer may be grafted with maleic anhydride or the like and used.

The site into which the functional group is introduced may be either a polymerization terminal or a side chain of the block copolymer (P). In addition, the functional group may be used alone or in combination of any two or more thereof. It is preferred that the modifier is added in an amount ranging typically from 0.01 to 10 mol equivalent on the basis of the anionic polymerization initiator.

<Hydrogenation Step>

When the block copolymer (P) or the modified block copolymer (P), which is obtained by the aforementioned method, is subjected to a hydrogenation step, the hydrogenated block copolymer (A) can be produced. As the hydrogenation method, known methods may be adopted. For example, a solution prepared by dissolving the block copolymer (P) in a solvent that does not affect the hydrogenation reaction is subjected to hydrogenation reaction in the presence of, as a hydrogenation catalyst, a Ziegler-based catalyst; a metal catalyst obtained by supporting a metal, such as nickel, platinum, palladium, ruthenium, or rhodium, on carbon, silica, diatomaceous earth, or the like; or an organic metal complex containing a metal, such as cobalt, nickel, palladium, rhodium, or ruthenium. In the hydrogenation step, the hydrogenation reaction may be carried out by adding the hydrogenation catalyst to the polymerization reaction solution containing the block copolymer (P) obtained by the aforementioned production method of the block copolymer (P). In the present invention, palladium carbon having palladium supported on carbon is preferred.

In the hydrogenation reaction, a hydrogen pressure is preferably 0.1 to 20 MPa, a reaction temperature is preferably 100 to 200° C., and a reaction time is preferably 1 to 20 hours.

A hydrogenation rate of the carbon-carbon double bonds in the polymer block (b) in the block copolymer (P) is 50 to 100 mol %. When the hydrogenation rate falls outside the foregoing range, it is difficult to obtain a polyolefin-based resin composition that is excellent in flexibility, molding processability, weather resistance, and whitening resistance. From such viewpoint, the hydrogenation rate is preferably 70 to 100 mol %, more preferably 80 to 100 mol %, and still more preferably 85 to 100 mol %. When the hydrogenation rate is 80 mol % or more, there is a tendency that the weather resistance is more improved. Incidentally, the hydrogenation rate can be calculated by measuring $^1$H-NMR of each of the block copolymer (P) and the hydrogenated block copolymer (A) after the hydrogenation.

[Polyolefin-Based Resin (B)]

The kind of the polyolefin-based resin (B) is not particularly limited, and conventionally already-known olefin-based polymers may be used. Preferred examples thereof include polyethylene, polypropylene, polybutene-1, polyhexene-1, poly-3-methyl-butene-1, poly-4-methyl-pentene-1, copolymers of ethylene and one or two or more α-olefins having 3 to 20 carbon atoms (for example, propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene, decadiene, etc.), an ethylene/propylene/diene copolymer (EPDM), an ethylene-vinyl acetate copolymer, an ethylene-acrylic acid copolymer, and the like. Of those, polypropylene-based resins, such as homopolypropylene, random polypropylene, block polypropylene, etc.; and polyethylene-based resins, such as high-density polyethylene (HDPE), linear low-density polyethylene (LLDPE), etc. are more preferred, with polypropylene-based resins being still more preferred. The polyolefin-based resin (B) may be used alone or in combination of any two or more thereof.

In the polyolefin-based resin composition of the present invention, a mass ratio of the polyolefin-based resin (B) and the hydrogenated block copolymer (A) [{polyolefin-based resin (B)}/{hydrogenated block copolymer W}] is 1/99 to 99/1. In view of the fact that the polyolefin-based resin composition of the present invention includes the specified hydrogenated block copolymer (A) having a constitutional unit derived from farnesene, the polyolefin-based resin composition of the present invention is favorable in flexibility and molding processability and excellent in weather resistance and whitening resistance. The instant mass ratio [{polyolefin-based resin (B)}/{hydrogenated block copolymer (A)}] is more preferably 10/90 to 90/10, and still more preferably 30/70 to 90/10. In addition, the mass ratio is yet still more preferably 50/50 to 90/10, and especially preferably 55/45 to 90/10 from the viewpoint that the polyolefin-based resin composition is also excellent in rigidity.

A total content of the hydrogenated block copolymer (A) and the polyolefin-based resin (B) in the polyolefin-based resin composition is preferably 50% by mass or more, more preferably 80% by mass or more, still more preferably 90% by mass or more, and yet still more preferably 95% by mass or more.

[Other Components]

The polyolefin-based resin composition of the present invention may include, in addition the hydrogenated block copolymer (A) and the polyolefin-based resin (B) as described above, other components within the range where the effects of the present invention are not hindered.

Examples of other components include inorganic fillers. Specific examples of such an inorganic filler include talc, calcium carbonate, silica, a glass fiber, a carbon fiber, mica, kaolin, titanium oxide, and the like. Of those, talc is preferred.

Furthermore, the polyolefin-based resin composition of the present invention may include other additives, for example, a thermal-age resister, an antioxidant, a photostabilizer, an antistatic agent, a mold releasing agent, a flame retardant, a foaming agent, a pigment, a dye, a whitening agent, etc. for the purpose of modification thereof.

In addition, the mold releasing agent includes a lubricant. When the polyolefin-based resin composition of the present invention includes a lubricant, the frictional resistance of the surface of a molded body obtained from the polyolefin-based resin composition of the present invention is reduced, and the slidability is improved, and as a result, the scratch resistance and the wear resistance are improved. As the lubricant, known lubricants may be used. Examples thereof may include fatty acid amides, such as erucamide, oleamide, etc.; silicone-based compounds, such as silicone oil, a fine powder of silicone/acrylic polymer, etc.; fluorine compounds, such as fluorinated hydrocarbon oil, polytetrafluoroethylene, etc.; polyalkylene oxides, such as polyethylene oxide, polypropylene oxide, etc.; ester oils; fine powders of ultra high molecular weight polyethylene, etc.; and the like. These lubricants may be used alone or in combination of any two or more thereof. Of those, erucamide and oleamide are more preferred from the viewpoint of improving the slidability, the scratch resistance, and the wear resistance.

In the case where the polyolefin-based resin composition includes a lubricant, a content of the lubricant is preferably 0.01 to 10 parts by mass, more preferably 0.05 to 5 parts by mass, still more preferably 0.1 to 1 part by mass, and yet still more preferably 0.1 to 0.5 parts by mass on the basis of 100 parts by mass of the polyolefin-based resin composition.

[Production Method of Polyolefin-Based Resin Composition]

A production method of the polyolefin-based resin composition of the present invention is not particularly limited, and examples thereof include various conventional production methods. For example, the polyolefin-based resin composition may be suitably produced by dry blending the hydrogenated block copolymer (A), the polyolefin-based resin (B), and other components to be used, if desired and then melt kneading the contents using a kneading machine, such as a single-screw extruder, a twin-screw extruder, a kneader, a Banbury mixer, a roller, etc.

A hardness of the polyolefin-based resin composition of the present invention is preferably 80 or less, more preferably 70 or less, and still more preferably 60 or less from the viewpoint of flexibility. In addition, the hardness is preferably 5 or more, more preferably 10 or more, and still more preferably 15 or more from the viewpoint of strength. In addition, the higher an MFR value of the polyolefin-based resin composition, the more excellent the molding processability is. The MFR value is preferably 5 g/10 min or more, and more preferably 10 g/10 min or more.

Furthermore, the polyolefin-based resin composition of the present invention can be adhered to various adherends. Above all, the polyolefin-based resin composition of the present invention exhibits an excellent adhesive force to a dynamic crosslinking type olefin-based thermoplastic elastomer or vulcanized rubber as described later. The strength of the adhesive force of the polyolefin-based resin composition of the present invention to the adherend is not particularly limited; however, it is preferably 25 N/cm$^2$ or more, more preferably 30 N/cm$^2$ or more, and still more preferably 40 N/cm$^2$ or more.

So long as the physical properties of the polyolefin-based resin composition fall within the foregoing ranges, the polyolefin-based resin composition is excellent in processability, and a molded body and a composite molded body as described later may be preferably produced. In addition, the molded body and the composite molded body obtained by using the polyolefin-based resin composition of the present invention can be well balanced with respect to flexibility and molding processability.

Incidentally, the aforementioned physical properties can be suitably measured by the methods described in Examples.

[2] Molded Body and Composite Molded Body

The molded body of the present invention includes the polyolefin-based resin composition of the present invention. A shape of the molded body may be any shape so long as it may be produced by using the polyolefin-based resin composition of the present invention. For example, the polyolefin-based resin composition of the present invention may be molded in various shapes, such as a pellet, a film, a sheet, a plate, a pipe, a tube, a rod-like body, a granular body, etc. A production method of this molded body is not particularly limited, and the polyolefin-based resin composition of the present invention may be molded by various conventional molding methods, for example, injection molding, blow molding, press molding, extrusion molding, calender molding, etc. The polyolefin-based resin composition of the present invention is excellent in molding processability, and therefore, a molded body may be suitably obtained by injection molding with high cycle.

In addition, the polyolefin-based resin composition of the present invention and the molded body including the resin composition can be adhered to various adherends, and hence, they may be formed in a composite molded body in combination of a different kind of material, such as other resins, rubbers, etc. Above all, the polyolefin-based resin composition of the present invention exhibits an excellent adhesive force to a dynamic crosslinking type olefin-based thermoplastic elastomer and a vulcanized rubber, and hence, a composite molded body including at least one of them is preferred. A shape of the composite molded body including the polyolefin-based resin composition of the present invention and at least one of a dynamic crosslinking type olefin-based thermoplastic elastomer and a vulcanized rubber may be any shape so long as it may be produced by using the polyolefin-based resin composition of the present invention, and the polyolefin-based resin composition may be formed in any one of the aforementioned shapes.

<Dynamic Crosslinking Type Olefin-Based Thermoplastic Elastomer>

The dynamic crosslinking type olefin-based thermoplastic elastomer refers to a thermoplastic elastomer obtained by dynamically heat treating an ethylenic copolymer rubber and an olefin-based resin in the presence of a crosslinking agent, and examples thereof include thermoplastic elastomer compositions described in Japanese Patent No. 3399384 and WO 2009/110562A. This dynamic crosslinking type olefin-based thermoplastic elastomer is a multi-phase polymer material that is characterized by a sea-island structure in which crosslinked rubber particles resulting from crosslinking an ethylenic copolymer rubber with a crosslinking agent are finely dispersed as a domain (island phase) in an olefin-based thermoplastic resin that is a matrix (sea phase). Examples of the ethylenic copolymer rubber include a random copolymer resulting from copolymerizing ethylene, an α-olefin having 3 or more carbon atoms, and preferably 3 to 8 carbon atoms, and a non-conjugated diene. Examples of the α-olefin having 3 or more carbon atoms, which is copolymerized with ethylene, include propylene, 1-butene, 1-pentene, 1-hexene, 1-heptene, 1-octene, 1-decene, and the like. The α-olefin may be used alone or in combination of any two or more thereof. Examples of the non-conjugated diene to be copolymerized include dicyclopentadiene, 1,4-hexadiene, cyclooctadiene, methylene norbornene, ethylidene norbornene, 5-methyl-1,4-hexadiene, 4-methyl-1,4-hexadiene, 6-methyl-1,5-heptadiene, methyl-1,6-octadiene, and the like. These non-conjugated dienes may be used alone or in combination of any two or more thereof. The olefin-based resin is not particularly limited, and the conventionally already-known olefin-based polymers as exemplified in the above section "Polyolefin-based Resin (B)" may be used. The crosslinking agent is not particularly limited so long as it is useful for crosslinking of a general ethylenic copolymer rubber, such as EPM, EPDM, etc., and for example, sulfur, a sulfur compound, an organic peroxide, a phenol resin-based crosslinking agent, a quinoid-based crosslinking agent, an acrylic acid metal salt-based crosslinking agent, a bismaleimide-based crosslinking agent, and the like may be used.

As the dynamic crosslinking type olefin-based thermoplastic elastomer, a commercially available product may be used. Examples of the product include a trade name "SANTOPRENE" series, manufactured by ExxonMobil Chemical Company; a trade name "THERMORUN" series, manufactured by Mitsubishi Chemical Corporation; a trade name "MILASTOMER" series, manufactured by Mitsui Chemicals, Inc.; a trade name "ESPOLEX TPE" series, manufactured by Sumitomo Chemical Co., Ltd.; a trade name "SARLINK" series, manufactured by Toyobo Co., Ltd.; a trade name "JSR EXCELINK 1000" series, manufactured by JSR Corporation; and the like.

<Vulcanized Rubber>

As a rubber raw material of the vulcanized rubber, natural rubber (NR) and various synthetic rubbers that are conventionally used as a rubber raw material of rubber sole, and the like are used without particular limitations. Specific examples of the synthetic rubber include a styrene butadiene copolymer rubber (SBR), a polyisoprene rubber (IR), a polybutadiene rubber (BR), an acrylonitrile butadiene copolymer rubber (NBR), an ethylene-propylene-diene rubber (EPDM), a halogenated butyl rubber, and the like. These natural rubber and synthetic rubbers may be used alone or in combination of any two or more thereof. In addition, the vulcanized rubber is compounded with calcium carbonate, magnesium carbonate, a hydrous silicate, such as hydrous aluminum silicate, etc., a white filler, such as titanium dioxide, zinc oxide, etc., a black filler, such as carbon black, etc., and the like, and besides, a material that is generally compounded in a rubber raw material, such as a vulcanizing agent a vulcanization accelerator, a softening agent, an anti-aging agent, etc., in a compounding formulation as the need arises. In addition, as the vulcanized rubber, a commercially available product may be used.

A production method of the composite molded body including the polyolefin-based resin composition of the present invention and at least one of the dynamic crosslinking type olefin-based thermoplastic elastomer and the vulcanized rubber is not particularly limited, and the composite molded body may be formed by various conventional production methods, for example, injection molding, blow molding, press molding, extrusion molding, calender molding, etc. For example, a glass run channel that is one of applications of the composite molded body of the present invention is a component for sealing a sliding portion between a glass and a door of side window and may be produced by a method of inserting a straight portion made of the dynamic crosslinking type olefin-based thermoplastic elastomer and the like as obtained by extrusion molding into a mold and further subjecting the resin composition of the present invention to compression molding or injection molding in a corner portion.

In addition, the composite molded body may be a laminated structure including a layer made of the polyolefin-based resin composition of the present invention and a layer made of at least one of the dynamic crosslinking type olefin-based thermoplastic elastomer and the vulcanized rubber.

[3] Application of Polyolefin-Based Resin Composition and Molded Body

The polyolefin-based resin composition and the molded body of the present invention are favorable in flexibility and molding processability, excellent in weather resistance and whitening resistance, and also excellent in rigidity. In consequence, the polyolefin-based resin composition of the present invention and the molded body and the composite molded body obtained from the polyolefin-based resin composition may be suitably used as molded articles, such as a pressure-sensitive adhesive, a sheet, a film, a tube, a hose, a belt, etc. Specifically, the polyolefin-based resin composition of the present invention and the molded body and the composite molded body obtained from the polyolefin-based resin composition may be suitably used for pressure-sensitive adhesive materials, such as a hot melt adhesive, a pressure-sensitive adhesive tape, a pressure-sensitive adhesive layer of protective film, etc.; various vibration absorbing or damping members, such as damping rubber, a mat, a sheet, a cushion, a damper, a pad, a mount rubber, etc.; footwear, such as sport shoes, fashion sandals, etc.; consumer electronics members, such as a television set, a stereo audio set, a cleaner, a refrigerator, etc.; building materials, such as a packing used for sealing door or window frames of building, etc.; automobile interior or exterior components, such as a bumper component, a body panel, a weather strip, a grommet, a glass run channel, a skin material of instrument panel, etc., an air-bag cover, etc.; grip members of scissors, a screwdriver, a toothbrush, poles for skiing, and the like; food wrapping materials, such as a wrapping film for foods, etc.; medical devices, such as an infusion solution bag, a syringe, a catheter, etc.; stoppers and cap liners for a container for storing foods, beverages, drugs, and the like; and so on.

Specifically, examples of an application for which a characteristic feature of excellent whitening resistance of the present invention is required include pressure-sensitive adhesive materials, such as a hot melt adhesive, a pressure-sensitive adhesive tape, a pressure-sensitive adhesive layer of protective film, etc.; consumer electronics members, such as a television set, a stereo audio set, a cleaner, a refrigerator, etc.; food wrapping materials, such as a wrapping film for foods, etc.; medical devices, such as an infusion solution bag, a catheter, etc.; stoppers for a container for storing foods, beverages, drugs, and the like; and so on.

EXAMPLES

The present invention is hereunder described by reference to Examples, but it should not be construed that the present invention is limited to these Examples. Incidentally, β-farnesene (purity: 97.6 weight %, manufactured by Amyris, Inc.) was purified using a 3-angstrom molecular sieve and distilled under a nitrogen atmosphere to remove hydrocarbon-based impurities, such as zingiberene, bisabolene, farnesene epoxide, farnesol isomers, E,E-farnesol, squalene, ergosterol, several kinds of dimers of farnesene, etc., therefrom, and the thus purified β-farnesene was used in the following polymerization.

(1) Measurement of Molecular Weight Distribution and Peak Top Molecular Weight (Mp)

A peak top molecular weight (Mp) of the styrene block and a peak top molecular weight (Mp) and a molecular weight distribution (Mw/Mn) of the hydrogenated block copolymer were determined by GPC (gel permeation chromatography) in terms of a molecular weight of polystyrene as a reference standard substance. The peak top molecular weight (Mp) was determined from a position of a peak top of the molecular weight distribution. Measuring devices and conditions are as follows.

Device: GPC device "GPC8020", manufactured by Tosoh Corporation
Separation column: "TSKgel G4000HXL", manufactured by Tosoh Corporation
Detector: "RI-8020", manufactured by Tosoh Corporation
Eluent: Tetrahydrofuran
Eluent flow rate: 1.0 mL/min
Sample concentration: 5 mg/10 mL
Column temperature: 40° C.

(2) Measurement Method of Hydrogenation Rate

In each of the Examples and Comparative Examples, the block copolymer (P) and the hydrogenated block copolymer (A) after the hydrogenation were respectively dissolved in a deuterated chloroform solvent, and each of the resulting solutions was subjected to $^1$H-NMR measurement at 50° C. using "Lambda-500", manufactured by JOEL Ltd. A hydrogenation rate of the polymer block (b) in the hydrogenated block copolymer (A) was calculated from the peak of protons contained in carbon-carbon double bonds observed in the range of from 4.5 to 6.0 ppm in the resulting spectrum, according to the following formula.

Hydrogenation rate={1−(Molar number of carbon-carbon double bonds contained per mol of hydrogenated block copolymer (A))/(Molar number of carbon-carbon double bonds contained per mol of block copolymer (P)}×100 (mol %)

(3) Measurement Method of Melt Flow Rate (MFR)

The polyolefin-based resin composition obtained in each of the Examples and Comparative Examples was measured using a melt indexer L244 (manufactured by Technol Seven Co., Ltd.) under conditions at 200° C. and 98 N from a nozzle having a dimension of 2.095 mm in diameter×8 mm in length. Incidentally, the higher the MFR Value, the more excellent the molding processability is.

(4) Measurement Method of 100% Modulus, Tensile Strength at Break, and Tensile Elongation at Break A sheet (molded body) (length: 150 mm, width: 150 mm, thickness: 1 mm) was obtained by subjecting the polyolefin-based resin composition obtained in each of the Examples and Comparative Examples to compression molding at 230° C. and 10 MPa for 3 minutes. A test piece of dumbbell No. 5 type in conformity with JIS K6251 was punched out from this sheet, thereby obtaining a test piece. Using this test piece, a 100% modulus, a tensile strength at break, and a tensile elongation at break were measured under a temperature condition at 23° C. and under a tensile speed condition at 500 mm/min by using an Instron universal testing machine ("INSTRON 5566", manufactured by Instron Japan Co., Ltd.) in conformity with JIS K6251. The lower the 100% modulus, the more excellent the flexibility is. Furthermore, the higher tensile strength is favorable and the larger tensile elongation is favorable.

(5) Measurement Method of Hardness

The test piece obtained in the above item (4) was measured using an indenter of a type D durometer in conformity with JIS K6253-3. Incidentally, the lower the hardness, the more excellent the flexibility is.

(6) Measurement Method of Flexural Modulus

A molded body (length: 60 mm, width: 10 mm, thickness: 3 mm) was obtained by subjecting the polyolefin-based resin composition obtained in each of Examples 2, 10 to 12, and 25 and Comparative Examples 6 to 9 to compression molding at 230° C. and 10 MPa for 3 minutes. Using this test piece, a flexural modulus was measured under a temperature condition at 23° C. and at a test speed of 2 mm/min by using an Instron universal testing machine in conformity with JIS K7171. The higher the flexural modulus, the more excellent the rigidity is.

(7) Measurement Method of Weather Resistance

A sheet (molded body) (length: 150 mm, width: 150 mm, thickness: 1 mm) was obtained by subjecting the polyolefin-based resin composition obtained in each of the Examples and Comparative Examples to compression molding at 230° C. and 10 MPa for 3 minutes. This sheet was allowed to stand under an atmosphere at a temperature of 200° C. for 60 minutes. Any change of color before and after standing was observed by visual inspection and finger touch and evaluated according to the following criteria.

1: No change is observed.
2: Yellowing is slightly observed.
3: Yellowing is observed.
4: Yellowing is vigorous, and an increase of tackiness of the sheet surface is observed.

(8) Measurement Method of Whitening Resistance (Flexibility)

A sheet (molded body) (length: 150 mm, width: 150 mm, thickness: 1 mm) was obtained by carrying out the same operations as those in the above item (7). This sheet was allowed to stand at 23° C. for one day and then folded at 180°, followed by returning to the original state. The folded portion was observed with the naked eyes, and the state at that time was evaluated according to the following criteria.

1: No change is observed, and the flexibility is favorable.
2: A whitening phenomenon is slightly observed in the folded portion.
3: A whitening phenomenon is explicitly observed.

<Hydrogenated Block Copolymer (A)>

Production Example 1

A pressure reaction vessel having been purged with nitrogen and dried was charged with 50.0 kg of cyclohexane as a solvent and 41.3 g of sec-butyllithium (10.5% by mass cyclohexane solution) (4.3 g of sec-butyllithium) as an anionic polymerization initiator. After raising the temperature to 50° C., 1.12 kg of styrene (1) was added, and the contents were polymerized for one hour. Subsequently, 10.25 kg of β-farnesene was added, and the contents were polymerized for two hours. Furthermore, 1.12 kg of styrene (2) was added, and the contents were polymerized for one hour, thereby obtaining a reaction solution containing a polystyrene-poly(β-farnesene)-polystyrene triblock copolymer. To this reaction solution, palladium carbon (amount of palladium supported: 5% by mass) was added as a hydrogenation catalyst in an amount of 5% by mass on the basis of the block copolymer, and the contents were allowed to react under conditions at a hydrogen pressure of 2 MPa and 150° C. for 10 hours. After allowing the reaction mixture to stand for cooling and releasing the pressure, the palladium carbon was removed by means of filtration, and the filtrate was concentrated and further dried in vacuo, thereby obtaining a hydrogenated product of the polystyrene-poly(β-farnesene)-p olystyrene triblock copolymer (hereinafter referred to as "hydrogenated block copolymer (I)-1"). The hydrogenated block copolymer (I)-1 was subjected to the aforementioned evaluations.

Incidentally, as for the peak top molecular weight (Mp) of the styrene block in the hydrogenated block copolymer (I)-1, a measured value of the peak top molecular weight (Mp) of polystyrene obtained by polymerizing the styrene (1) and then sampling in the process of polymerizing the polystyrene-poly((-farnesene)-polystyrene triblock copolymer was defined as the peak top molecular weight (Mp) of the styrene block in the hydrogenated block copolymer (1)-1.

The results are shown in Table 1.

Production Examples 2 to 8 and 11 to 13

Hydrogenated block copolymers (I)-2 to (I)-8 and (I')-11 to (I')-13 were produced in the same procedures as those in Production Example 1, except for following the formulations as shown in Table 1, respectively. The resulting hydrogenated block copolymers (I)-2 to (I)-8 and (I')-11 to (I')-13 were subjected to the aforementioned evaluations. The results are shown in Table 1.

Production Examples 9 and 10

Hydrogenated block copolymers (I)-9 and (I')-10 were produced in the same procedures as those in Production Example 1, except for following the formulations as shown in Table 1 while changing the hydrogenation reaction time to 4 hours for the hydrogenated block copolymer (I)-9 and changing the hydrogenation reaction time to 2 hours for the hydrogenated block copolymer (I')-10, respectively. The resulting hydrogenated block copolymers (I)-9 and (I')-10 were subjected to the aforementioned evaluations. The results are shown in Table 1.

Production Example 14

A hydrogenated block copolymer (I')-14 was produced in the same procedures as those in Production Example 1, except for mixing 50.0 kg of cyclohexane as a solvent with 108 g of tetrahydrofuran and following the formulation as shown in Table 1. The resulting hydrogenated block copolymer (I')-14 was subjected to the aforementioned evaluations. The results are shown in Table 1.

TABLE 1

| | Production Example | | | | | | |
|---|---|---|---|---|---|---|---|
| | 1 | 2 | 3 | 4 | 5 | 6 | 7 |
| Hydrogenated copolymer | (I)-1 | (I)-2 | (I)-3 | (I)-4 | (I)-5 | (I)-6 | (I)-7 |
| Use amount [kg] | | | | | | | |
| Cyclohexane | 50.0 | 50.0 | 50.0 | 50.0 | 50.0 | 50.0 | 50.0 |
| sec-BuLi cyclohexane solution (10.5% by mass) | 0.0413 | 0.0369 | 0.0155 | 0.0367 | 0.0212 | 0.8340 | 0.0230 |
| Styrene (1) | 1.12 | 1.87 | 1.32 | 2.50 | 1.32 | 1.87 | 1.32 |
| Styrene (2) | 1.12 | 1.87 | 1.32 | 2.50 | 1.32 | 1.87 | 1.32 |
| β-Farnesene | 10.25 | 8.75 | 6.18 | 7.50 | 3.09 | 4.37 | 3.44 |
| Isoprene | | | | | 3.09 | 4.37 | |
| Butadiene | | | | | | | 2.73 |
| Tetrahydrofuran | | | | | | | |
| (a)/(b) [mass ratio](*1) | 18/82 | 30/70 | 30/70 | 40/60 | 30/70 | 30/70 | 30/70 |
| (b1)/(b) [% by mass](*2) | 100 | 100 | 100 | 100 | 50 | 50 | 56 |
| Polymer skeleton(*3) | St-F-St | St-F-St | St-F-St | St-F-St | St-(F/Ip)-St | St-(F/Ip)-St | St-(F/Bd)-St |
| Physical properties | | | | | | | |
| Peak top molecular weight (Mp) of styrene block | 16,600 | 31,000 | 52,000 | 41,500 | 38,000 | 13,700 | 35,000 |
| Peak top molecular weight (Mp) of hydrogenated block copolymer | 200,500 | 222,000 | 373,400 | 220,5000 | 310,000 | 110,000 | 317,000 |
| Molecular weight distribution (Mw/Mn) | 1.23 | 1.13 | 1.40 | 1.22 | 1.14 | 1.06 | 1.15 |
| Hydrogenation rate (%)(*4) | 93.2 | 91.0 | 90.2 | 90.4 | 98.0 | 98.1 | 98.2 |

| | Production Example | | | | | | |
|---|---|---|---|---|---|---|---|
| | 8 | 9 | 10 | 11 | 12 | 13 | 14 |
| Hydrogenated copolymer | (I)-8 | (I)-9 | (I')-10 | (I')-11 | (I')-12 | (I')-13 | (I')-14 |
| Use amount [kg] | | | | | | | |
| Cyclohexane | 50.0 | 50.0 | 50.0 | 50.0 | 50.0 | 50.0 | 50.0 |
| sec-BuLi cyclohexane solution (10.5% by mass) | 0.0922 | 0.0369 | 0.0369 | 0.0994 | 0.0310 | 0.1390 | 0.1219 |
| Styrene (1) | 1.87 | 1.87 | 1.87 | 3.75 | 1.32 | 1.87 | 2.00 |
| Styrene (2) | 1.87 | 1.87 | 1.87 | 3.75 | 1.32 | 1.87 | 2.00 |
| β-Farnesene | 4.88 | 8.75 | 8.75 | 5.00 | | | |
| Isoprene | | | | | 3.44 | 4.88 | |
| Butadiene | 3.87 | | | | 2.73 | 3.87 | 8.50 |
| Tetrahydrofuran | | | | | | | 0.108 |
| (a)/(b) [mass ratio](*1) | 30/70 | 30/70 | 30/70 | 60/40 | 30/70 | 30/70 | 32/68 |
| (b1)/(b) [% by mass](*2) | 56 | 100 | 100 | 100 | 0 | 0 | 0 |
| Polymer skeleton(*3) | St-(F/Bd)-St | St-F-St | St-F-St | St-F-St | St-(Ip/Bd)-St | St-(Ip/Bd)-St | St-Bd-St |
| Physical properties | | | | | | | |
| Peak top molecular weight (Mp) of styrene block | 12,400 | 31,000 | 31,000 | 23,000 | 26,000 | 8,200 | 10,000 |
| Peak top molecular weight (Mp) of hydrogenated block copolymer | 111,000 | 218,000 | 222,000 | 93,000 | 262,000 | 82,500 | 102,000 |

TABLE 1-continued

| | | | | | | | |
|---|---|---|---|---|---|---|---|
| Molecular weight distribution (Mw/Mn) | 1.04 | 1.15 | 1.10 | 1.06 | 1.06 | 1.06 | 1.08 |
| Hydrogenation rate (%)(*4) | 98.5 | 74.7 | 45.0 | 98.4 | 97.8 | 97.8 | 97.1 |

(*1)(a)/(b) represents a mass ratio of the total amount of the constitutional unit (a) to the total amount of the constitutional unit (b).
(*2)(b1)/(b) represents a content of the constitutional unit (b1) derived from farnesene in the total amount of the polymer block (b) derived from a conjugated diene.
(*3)St-F-St represents a polystyrene-poly(β-farnesene)-polystyrene triblock copolymer. St-(F/Ip)-St represents a polystyrene-poly(β-farnesene/Isoprene)-polystyrene triblock copolymer. St-(F/Bd)-St represents a polystyrene-poly(β-farnesene/butadiene)-polystyrene triblock copolymer. St-(IP/Bd)-St represents a polystyrene-poly(isoprene/butadiene)-polystyrene triblock copolymer. St-Bd-St represents a polystyrene-polybutadiene-polystyrene triblock copolymer.
(*4)The hydrogenation rate represents a hydrogenation rate of carbon-carbon double bonds in the constitutional unit (b) derived from a conjugated diene.

Examples 1 to 15 and 25 and Comparative Examples 1 to 13

As the hydrogenated block copolymer (A), each of the aforementioned hydrogenated block copolymers (I)-1 to (I)-9 and (I')-10 to (I')-14 was used; the hydrogenated block copolymer (A) and the polyolefin-based resin (B) as described below were dry blended in each of the formulations as shown in Tables 2 to 4; the contents were melt kneaded using a twin-screw extruder ("TEX-44XCT", manufactured by The Japan Steel Works, Ltd.) at a cylinder temperature of 230° C. and a screw rotation rate of 200 rpm; and the resultant was extruded in a strand form, which was then cut to obtain a polyolefin-based resin composition. The resulting polyolefin-based resin compositions were subjected to the aforementioned evaluations. The results are shown in Tables 2 to 4.

<Polyolefin-Based Resin (B)>
Random polypropylene: F327, MFR=7.0 g/10 min [at 230° C. and 21 N] (manufactured by Prime Polymer Co., Ltd.)
Homopolypropylene: NOVATEC EA7A, MFR=1.4 g/10 min [at 230° C. and 21 N] (manufactured by Japan Polypropylene Corporation)
HDPE: NOVATEC HB112R, MFR=0.04 g/10 min [at 190° C. and 21 N] (manufactured by Japan Polypropylene Corporation)
LLDPE: ULT-ZEX 2022L, MFR=2.0 g/10 min [at 190° C. and 21 N] (manufactured by Prime Polymer Co., Ltd.)

TABLE 2

| | Example | | | | | | | | | Comparative Example | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 |
| Thermoplastic polymer composition | | | | | | | | | | | | | | |
| (A) Hydrogenated copolymer (I)-1 | 40 | | | | | | | | | | | | | |
| Hydrogenated copolymer (I)-2 | | 40 | | | | | | | | | | | | |
| Hydrogenated copolymer (I)-3 | | | 40 | | | | | | | | | | | |
| Hydrogenated copolymer (I)-4 | | | | 40 | | | | | | | | | | |
| Hydrogenated copolymer (I)-5 | | | | | 40 | | | | | | | | | |
| Hydrogenated copolymer (I)-6 | | | | | | 40 | | | | | | | | |
| Hydrogenated copolymer (I)-7 | | | | | | | 40 | | | | | | | |
| Hydrogenated copolymer (I)-8 | | | | | | | | 40 | | | | | | |
| Hydrogenated copolymer (I)-9 | | | | | | | | | 40 | | | | | |
| Hydrogenated copolymer (I')-10 | | | | | | | | | | 40 | | | | |
| Hydrogenated copolymer (I')-11 | | | | | | | | | | | 40 | | | |
| Hydrogenated copolymer (I')-12 | | | | | | | | | | | | 40 | | |
| Hydrogenated copolymer (I')-13 | | | | | | | | | | | | | 40 | |
| Hydrogenated copolymer (I')-14 | | | | | | | | | | | | | | 40 |
| (B) Random polypropylene (*5) | 60 | 60 | 60 | 60 | 60 | 60 | 60 | 60 | 60 | 60 | 60 | 60 | 60 | 60 |
| Evaluation results | | | | | | | | | | | | | | |
| MFR [at 200° C. and 98 N] (g/10 min) | 58 | 57 | 70 | 50 | 18 | 15 | 15 | 12 | 70 | 70 | 16 | 3.1 | 12 | 13 |
| Hardness [type D] | 39 | 40 | 39 | 50 | 43 | 45 | 47 | 46 | 40 | 38 | 70 | 52 | 51 | 52 |
| 100% modulus (MPa) | 8.7 | 9.2 | 8.7 | 11 | 8.7 | 9.8 | 10 | 10 | 9.0 | 9.2 | 12 | 11 | 11 | 12 |
| Tensile strength at break (MPa) | 16 | 20 | 16 | 15 | 29 | 34 | 39 | 38 | 18 | 17 | 13 | 44 | 41 | 41 |
| Tensile elongation at break (%) | 620 | 680 | 620 | 600 | 750 | 790 | 740 | 680 | 680 | 550 | 180 | 600 | 570 | 600 |
| Weather resistance | 1 | 1 | 1 | 1 | 1 | 1 | 1 | 1 | 2 | 4 | 1 | 1 | 1 | 1 |
| Whitening resistance | 1 | 1 | 1 | 1 | 1 | 1 | 1 | 1 | 1 | 3 | 3 | 3 | 3 | 3 |

(*5): Random polypropylene: F327, MFR = 7.0 g/10 min [at 230° C. and 21 N], manufactured by Prime Polymer Co., Ltd.

TABLE 3

| | Example | | | | | Comparative Example | | | | | |
|---|---|---|---|---|---|---|---|---|---|---|---|
| | 2 | 10 | 11 | 25 | 12 | 1 | 2 | 6 | 7 | 8 | 9 |
| Thermoplastic polymer composition | | | | | | | | | | | |
| (A) Hydrogenated copolymer (I)-2 | 40 | 10 | 30 | 50 | 60 | | | 100 | | | |
| Hydrogenated copolymer (I')-10 | | | | | | 40 | | | 10 | | |

TABLE 3-continued

|  | Example |  |  |  |  | Comparative Example |  |  |  |  |  |
| --- | --- | --- | --- | --- | --- | --- | --- | --- | --- | --- | --- |
|  | 2 | 10 | 11 | 25 | 12 | 1 | 2 | 6 | 7 | 8 | 9 |
| Hydrogenated copolymer (I')-11 |  |  |  |  |  |  | 40 |  |  |  |  |
| Hydrogenated copolymer (I')-12 |  |  |  |  |  |  |  |  |  | 10 |  |
| (B) Random polypropylene (*6) | 60 | 90 | 70 | 50 | 40 | 60 | 60 |  | 90 | 90 | 100 |
| Evaluation results |  |  |  |  |  |  |  |  |  |  |  |
| MFR [at 200° C. and 98 N] (g/10 min) | 57 | 93 | 71 | 51 | 44 | 70 | 16 | No flow | 98 | 21 | 70 |
| Hardness [type D] | 40 | 57 | 48 | 35 | 28 | 38 | 70 | 0 | 57 | 60 | 66 |
| 100% modulus (MPa) | 9.2 | 15 | 10.0 | 7.3 | 4.8 | 9.2 | 12 | 0.4 | 15 | 16 | 16 |
| Tensile strength at break (MPa) | 20 | 30 | 21 | 18 | 15 | 17 | 13 | 7.5 | 29 | 34 | 32 |
| Tensile elongation at break (%) | 680 | 800 | 700 | 670 | 650 | 550 | 180 | 700 | 780 | 730 | 800 |
| Flexural Modulus (MPa) | 163 | 480 | 252 | 111 | 39 | — | — | 2 | 491 | 458 | 620 |
| Weather resistance | 1 | 1 | 1 | 1 | 1 | 4 | 1 | 1 | 4 | 1 | 1 |
| Whitening resistance | 1 | 1 | 1 | 1 | 1 | 3 | 3 | 1 | 3 | 3 | 3 |

(*6): Random polypropylene: F327, MFR = 7.0 g/10 min [at 230° C. and 21 N], manufactured by Prime Polymer Co., Ltd.

TABLE 4

|  | Example |  |  | Comparative Example |  |  |  |
| --- | --- | --- | --- | --- | --- | --- | --- |
|  | 13 | 14 | 15 | 10 | 11 | 12 | 13 |
| Thermoplastic polymer composition |  |  |  |  |  |  |  |
| (A) Hydrogenated copolymer (I)-8 | 40 | 40 | 40 |  |  |  |  |
| Hydrogenated copolymer (I')-10 |  |  |  | 40 |  |  |  |
| Hydrogenated copolymer (I')-14 |  |  |  |  | 40 | 40 | 40 |
| Homopropylene (*7) | 60 |  |  | 60 | 60 |  |  |
| (B) HDPE (*8) |  | 60 |  |  |  | 60 |  |
| LLDPE (*9) |  |  | 60 |  |  |  | 60 |
| Evaluation results |  |  |  |  |  |  |  |
| MFR [at 200° C. and 98 N] (g/10 min) | 76 | 0.5 | 33 | 80 | 16 | No flow | 1.9 |
| Hardness [type D] | 58 | 26 | 30 | 58 | 57 | 49 | 40 |
| 100% modulus (MPa) | 12 | 6.2 | 5.4 | 11 | 16 | — | 6.3 |
| Tensile strength at break (MPa) | 35 | 13 | 16 | 11 | 38 | 11 | 13 |
| Tensile elongation at break (%) | 450 | 250 | 650 | 140 | 530 | 30 | 450 |
| Weather resistance | 1 | 1 | 1 | 4 | 1 | 1 | 1 |
| Whitening resistance | 1 | 1 | 1 | 3 | 3 | 2 | 2 |

(*7): Homopolypropylene: NOVATEC EA7A, MFR = 1.4 g/10 min [at 230° C. and 21 N], manufactured by Japan Polypropylene Corporation
(*8): HDPE: NOVATEC HB112R, MFR = 0.04 g/10 min [at 190° C. and 21 N], manufactured by Japan Polypropylene Corporation
(*9): LLDPE: ULT-ZEX 2022L, MFR = 2.0 g/10 min [at 190° C. and 21 N], manufactured by Prime Polymer Co., Ltd.

It is noted from Tables 2 to 4 that the polyolefin-based resin compositions of Examples 1 to 15 and 25 contain the hydrogenated block copolymer (A) satisfying the constitutional requirements of the present invention in a prescribed proportion, and hence, they are favorable in flexibility and molding processability and excellent in weather resistance and whitening resistance.

On the other hand, as for the polyolefin-based resin composition of Comparative Example 1, the hydrogenation rate of the hydrogenated block copolymer (A) is low as 45.0%, and hence, it is small in tensile elongation, and also inferior in weather resistance and whitening resistance, as compared with those of Examples 1 to 9 as shown in Table 2. As for the polyolefin-based resin composition of Comparative Example 2, the mass ratio of the polymer block (a) and the polymer block (b) [(a)/(b)] of the hydrogenated copolymer (A) is 60/40, a value of which falls outside the scope of the present invention, and hence, it is high in hardness and inferior in flexibility, small in tensile elongation, and also inferior in whitening resistance. As for the polyolefin-based resin compositions of Comparative Examples 3 to 5, since the hydrogenated block copolymer (A) does not have the constitutional unit (b1) derived from farnesene, they are inferior in whitening resistance.

In addition, it is noted from Table 3 that the polyolefin-based resin compositions of the present invention give rise to the effects of the present invention even by changing the mass ratio of the hydrogenated block copolymer (A) and the polyolefin-based resin (B). In addition thereto, it is noted that the resin compositions of Examples 10 and 11 are high in flexural modulus and excellent in rigidity. Furthermore, in comparison of Example 10 with Comparative Examples 7, 8, and 9, it is evident that in the case of containing the hydrogenated block copolymer (A) satisfying the constitutional requirements of the present invention, the molding processability, weather resistance, and whitening resistance are improved while maintaining the same performance with respect to tensile strength or tensile elongation, as compared with the case of containing the polyolefin-based resin (B) alone or not containing the hydrogenated block copolymer (A) satisfying the constitutional requirements of the present invention. On the other hand, it is evident that Comparative Example 6 not containing the polyolefin-based resin (B) is poor in flow ability and inferior in molding processability.

In addition, it is noted from Table 4 that the polyolefin-based resin compositions of the present invention give rise to the effects of the present invention even by changing the kind of the polyolefin-based resin (B). In particular, in the case of using a polypropylene-based resin as the polyolefin-based resin (B), the effects of the present invention can be more exhibited. On the other hand, the resin compositions of Comparative Examples 10 to 13 not containing the hydrogenated block copolymer (A) satisfying the constitutional requirements of the present invention are inferior especially in weather resistance and whitening resistance.

Examples 16 to 24

<Production of Polyolefin-Based Resin Composition>

As the hydrogenated block copolymer (A), each of the aforementioned hydrogenated block copolymers (I)-1 and (I)-2 was used; the hydrogenated block copolymer (A) and the polyolefin-based resin (B) were dry blended in each of the formulations as shown in Table 6; the contents were melt kneaded using a twin-screw extruder ("TEX-44XCT", manufactured by The Japan Steel Works, Ltd.) at a cylinder temperature of 230° C. and a screw rotation rate of 200 rpm; and the resultant was extruded in a strand form, which was then cut to obtain a polyolefin-based resin composition. The resulting polyolefin-based resin compositions were measured with respect to MFR and hardness. The results are shown in Table 6.

<Preparation of Adherend>

Adherend 1: Adherend Made of Dynamic Crosslinking Type Olefin-Based Thermoplastic Elastomer A sheet (molded body) (length: 150 mm, width: 150 mm, thickness: 2 mm) was obtained by subjecting SANTOPRENE 201-55 (manufactured by ExxonMobil Chemical Company) to compression molding at 230° C. and 10 MPa for 3 minutes. This sheet was punched out in a size of 10 mm in length, 50 mm in width, and 2 min in thickness, thereby obtaining Adherend 1. In addition, the adherend was measured with respect to hardness by using an indenter of a type D durometer in conformity with JIS K6253-3. As a result, the hardness was 60 [type A].

Adherends 2 to 4: Adherends Made of Vulcanized Rubber

A rubber component of every sort, carbon black, an anti-aging agent, stearic acid, and zinc white were kneaded in each of the formulations as shown in Table 5 by a Banbury mixer at 150° C. for 6 minutes (kneading first stage). Subsequently, the kneaded mixture was taken out and cooled, and thereafter, a vulcanizing agent and a vulcanization accelerator were further added, followed by kneading by a Banbury mixer at 50° C. for one minute (kneading second stage), thereby obtaining a mixture. The mixture was further subjected to compression molding using a compression molding machine under the respective vulcanization conditions as shown in Table 5, thereby obtaining a sheet (molded body) (length: 150 mm, width: 150 mm, thickness: 2 mm). This sheet was punched out in a size of 10 mm in length, 50 mm in width, and 2 mm in thickness, thereby obtaining Adherends 2 to 4. In addition, each of the adherends was measured with respect to hardness by using an indenter of a type D durometer in conformity with JIS K6253-3. The measurement results of the hardness are shown in Table 5.

<Preparation of Composite Molded Body>

A sheet (molded body) (length: 150 mm, width: 150 mm, thickness: 1 mm) was obtained by subjecting each of the above-obtained polyolefin-based resin compositions to compression molding at 230° C. and 10 MPa for 3 minutes. This sheet was punched out in a size of 10 mm in length, 50 mm in width, and 1 mm in thickness, thereby obtaining a sheet (molded body) of the polyolefin-based resin composition.

Each of the above-obtained Adherends 1 to 4 (length: 10 mm, width: 50 mm, thickness: 2 mm) and a laminate obtained by superimposing two sheets of the sheet of the polyolefin-based resin composition (length: 10 mm, width: 50 mm, thickness: 1 mm) in a thickness of 2 mm were arranged left and right and installed in a compression mold (length: 10 mm, width: 100 mm, thickness: 2 mm). The resultant was subjected to compression molding at 200° C. and 2 MPa for 2 minutes, thereby preparing a composite molded body (length: 10 mm, width: 100 mm, thickness: 2 mm). The two sheets of the sheet of the polyolefin-based resin composition were completely melted to form one sheet having a thickness of 2 mm, and each of the Adherends 1 to 4 and the sheet of the polyolefin-based resin composition were adhered on the side surfaces of the sheet (adhesion area: 10 mm×2 mm).

(9) Measurement of Adhesive Force

With respect to each of the above-obtained composite molded bodies (length: 10 mm, width: 100 mm, thickness: 2 mm), an adhesive force between the resin composition and the adherend was measured under a temperature condition at 23° C. and under a tensile speed condition at 200 mm/min by using an Instron universal testing machine ("INSTRON 5566", manufactured by Instron Japan Co., Ltd.). The results are shown in Table 6. Incidentally, the large the value, the more favorable the adhesive force is.

TABLE 5

| | | Adherend 2 Vulcanized EPDM | Adherend 3 Vulcanized SBR | Adherend 4 Vulcanized NR |
|---|---|---|---|---|
| Kneading first stage | Natural rubber | | | 100 |
| | Styrene butadiene rubber | | 100 | |
| | Ethylene propylene rubber | 100 | | |
| | Carbon black (1) | | | 45 |
| | Carbon black (2) | 50 | 60 | |
| | Anti-aging agent (1) | 1 | 1 | 1 |
| | Anti-aging agent (2) | | | 1 |
| | Stearic acid | 1 | 2 | 2 |
| | Zinc white | 5 | 3 | 3.5 |
| Kneading second stage | Vulcanizing agent | 1.5 | 1.5 | 1.5 |
| | Vulcanization accelerator (1) | | | 1.2 |
| | Vulcanization accelerator (2) | | 1 | |
| | Vulcanization accelerator (3) | 1.5 | | |
| | Vulcanization accelerator (4) | 0.5 | | |
| Vulcanization condition | Vulcanization temperature | 150 | 160 | 145 |
| | Vulcanization pressure | 1 | 1 | 1 |
| | Vulcanization time | 20 | 20 | 25 |
| Hardness [type A] | | 78 | 75 | 60 |

(Rubber Component)

Natural rubber: "STR20" (natural rubber, manufactured in Thailand) Styrene butadiene rubber: "JSR1502" (manufactured by JSR Corporation), styrene content=23.5% by mass (produced by the emulsion polymerization method)

Ethylene propylene rubber: "EPT4045" (manufactured by Mitsui Chemicals, Inc.)

(Reinforcing Agent)
   Carbon black (1): DAIBLACK I (manufactured by Mitsubishi Chemical Corporation)
   Carbon black (2): DAIBLACK H (manufactured by Mitsubishi Chemical Corporation)
(Anti-Aging Agent)
   Anti-aging agent (1): NOCRAC 6C (manufactured by Ouchi Shinko Chemical Industrial Co., Ltd.)
   Anti-aging agent (2): ANTAGE RD (manufactured by Kawaguchi Chemical Industry Co., Ltd.)
(Vulcanization Assistant)
   Stearic acid: LUNAC S-20 (manufactured by Kao Corporation)
   Zinc white: Zinc oxide (manufactured by Sakai Chemical Industry Co., Ltd.)
(Vulcanizing Agent)
   Sulfur (finely divided sulfur, 200 mesh, manufactured by Tsurumi Chemical Industries Co., Ltd.)
(Vulcanization Accelerator)
   Vulcanization accelerator (1): SANCELLER NS-G (manufactured by Sanshin Chemical Industry Co., Ltd.)
   Vulcanization accelerator (2): NOCCELER CZ-G (manufactured by Ouchi Shinko Chemical Industrial Co., Ltd.)
   Vulcanization accelerator (3): NOCCELER TS (manufactured by Ouchi Shinko Chemical Industrial Co., Ltd.)
   Vulcanization accelerator (4): NOCCELER M-P (manufactured by Ouchi Shinko Chemical Industrial Co., Ltd.)

TABLE 6

|  | Example | | | | | | | | |
|---|---|---|---|---|---|---|---|---|---|
|  | 16 | 17 | 18 | 19 | 20 | 21 | 22 | 23 | 24 |
| Thermoplastic polymer composition | | | | | | | | | |
| (A) Hydrogenated copolymer (I)-1 | 75 | 75 | 75 | 75 | | | | | |
| Hydrogenated copolymer (I)-2 | | | | | 75 | 75 | 75 | 75 | 50 |
| (B) Random polypropylene (*10) | 25 | 25 | 25 | 25 | 25 | 25 | 25 | 25 | 50 |
| Evaluation results | | | | | | | | | |
| MFR [at 200° C. and 98 N] (g/10 min) | 16 | 16 | 16 | 16 | 15 | 15 | 15 | 15 | 43 |
| Hardness [type A] | 47 | 47 | 47 | 47 | 46 | 46 | 46 | 46 | 78 |
| Evaluation of adhesive force | | | | | | | | | |
| Adherend (*11) | 1 | 2 | 3 | 4 | 1 | 2 | 3 | 4 | 2 |
| Adhesive force (N/cm²) | 75 | 61 | 67 | 66 | 45 | 38 | 41 | 40 | 83 |

(*10): Random polypropylene: F327, MFR = 7.0 g/10 min [a 230° C. and 21 N], manufactured by Prime Polymer Co., Ltd.
(*11): Adhered 1: Dynamic crossing type olefin-based thermoplastic eleastomer Adherend 2: Vulcanized EPDM Adherend 3: Vulcanized SBR Adherend 4: Vulcanized NR It is noted from Table 6 that the polyolefin-based resin compositions of Examples 16 to 24 are excellent in terms of adhesive force to various adherends, particularly the dynamic crosslinking type olefin-based thermoplastic elastomer. Furthermore, the polyolefin-based resin compositions of Examples 16 to 24 are lower in the hardness than the adherends, and hence, a composite molded body with such an adherend can be easily produced. The resulting composite molded article is well balanced with respect to flexibility and molding processability.

Examples 26 to 28

As the hydrogenated block copolymer (A), the aforementioned hydrogenated block copolymers (I)-1 was used; the hydrogenated block copolymer (A), the aforementioned polyolefin-based resin (B), and a lubricant described below were dry blended in each of the formulations as shown in Table 7; the contents were melt kneaded using a twin-screw extruder ("TEX-44XCT", manufactured by The Japan Steel Works, Ltd.) at a cylinder temperature of 230° C. and a screw rotation rate of 200 rpm; and the resultant was extruded in a strand form, which was then cut to obtain a polyolefin-based resin composition. The resulting polyolefin-based resin compositions were evaluated with respect to slidability and scratch resistance by the methods described below. The results are shown in Table 7.
(Lubricant)
   Erucamide: DIAMID L200 (manufactured by Nippon Kasei Chemical Co., Ltd.)
   Oleamide: DIAMID O-200 (manufactured by Nippon Kasei Chemical Co., Ltd.)
   Silicone oil: KL-96-300CS (manufactured by Shin-Etsu Chemical Co., Ltd.)
(10) Measurement Method of Slidability
   A sheet (molded body) (length: 150 mm, width: 150 mm, thickness: 1 mm) was obtained by subjecting the polyolefin-based resin composition obtained in each of the Examples to compression molding at 230° C. and 10 MPa for 3 minutes. This sheet was allowed to stand at 23° C. for one day, and the state at the time of rubbing the surface of the sheet by fingers was evaluated according to the following criteria.
   1: The state is extremely excellent as compared with that in the adherend 1 (dynamic crosslinking type olefin-based thermoplastic elastomer).
   2: The state is excellent as compared with that in the adherend 1.
   3: The state is identical to that in the adherent 1.
   4: The state is slightly inferior to that in the adherend 1.
   5: The state is conspicuously inferior to that in the adherend 1.
(11) Measurement Method of Scratch Resistance
   A sheet (molded body) (length: 150 mm, width: 150 mm, thickness: 1 mm) was obtained by carrying out the same operations as those in the above item (10). This sheet was allowed to stand at 23° C. for one day, and the state at the time of rubbing the surface of the sheet by a nail five times was evaluated according to the following criteria.
   1: The state is extremely excellent as compared with that in the adherend 1 (dynamic crosslinking type olefin-based thermoplastic elastomer).
   2: The state is excellent as compared with that in the adherend 1.
   3: The state is identical to that in the adherent 1.
   4: The state is slightly inferior to that in the adherend 1.
   5: The state is conspicuously inferior to that in the adherend 1.

TABLE 7

|  |  | Example | | | |
|---|---|---|---|---|---|
|  |  | 1 | 26 | 27 | 28 |
| Thermoplastic polymer composition | | | | | |
| (A) | Hydrogenated copolymer (I)-1 | 40 | 40 | 40 | 40 |
| (B) | Random polypropylene (*5) | 60 | 60 | 60 | 60 |
| Lubricant | Erucamide (*12) |  | 0.2 |  |  |
|  | Oleamide (*13) |  |  | 0.2 |  |
|  | Silicone oil (*14) |  |  |  | 0.2 |

TABLE 7-continued

| | Example | | | |
|---|---|---|---|---|
| | 1 | 26 | 27 | 28 |
| Evaluation results | | | | |
| Slidability | 3 | 1 | 1 | 2 |
| Scratch resistance | 3 | 1 | 1 | 1 |

(*5): Random polypropylene: F327, MFR = 7.0 g/10 min [at 230° C. and 21 N], manufactured by Prime Polymer Co., Ltd.
(*12): Erucamide: DIAMID L200, manufactured by Nippon Kasei Chemical Co., Ltd.
(*13): Oleamide: DIAMID O-200, manufactured by Nippon Kasei Chemical Co., Ltd.
(*14): Silicone oil: KL-96-300CS, manufactured by Shin-Etsu Chemical Co., Ltd.

It is noted from Table 7 that the molded body made of the polyolefin-based resin composition containing a lubricant of each of Examples 26 to 28 is more excellent in slidability and scratch resistance than the molded body made of a dynamic crosslinking type olefin-based thermoplastic elastomer.

The invention claimed is:

1. A polyolefin-based resin composition, comprising:
(A) a hydrogenated block copolymer, which is a hydrogenated product of a block copolymer including
    a polymer block (a) composed of a constitutional unit derived from an aromatic vinyl compound, and
    a polymer block (b) containing 1 to 100% by mass of a constitutional unit (b1) derived from farnesene and 99 to 0% by mass of a constitutional unit (b2) derived from a conjugated diene other than farnesene; and
(B) a polyolefin-based resin,
wherein a mass ratio of the polymer block (a) and the polymer block (b) [(a)/(b)] is from 1/99 to 55/45,
wherein 50 mol % or more of carbon-carbon double bonds in the polymer block (b) are hydrogenated,
wherein a mass ratio of the polyolefin-based resin (B) and the hydrogenated block copolymer (A) [{polyolefin-based resin (B)}/{hydrogenated block copolymer (A)}] is from 1/99 to 99/1, and
wherein the composition has an MFR value, under conditions at 200° C. and 98 N, of 5 g/10 min or more.

2. The polyolefin-based resin composition according to claim 1, wherein the farnesene is β-farnesene.

3. The polyolefin-based resin composition according to claim 1, wherein a hydrogenation rate of carbon-carbon double bonds in the polymer block (b) is 70 mol % or more.

4. The polyolefin-based resin composition according to claim 1, wherein a peak top molecular weight (Mp) of the hydrogenated block copolymer (A) is 4,000 to 1,500,000.

5. The polyolefin-based resin composition according to claim 1, wherein a molecular weight distribution (Mw/Mn) of the hydrogenated block copolymer (A) is 1 to 4.

6. The polyolefin-based resin composition according to claim 1, wherein the aromatic vinyl compound is styrene.

7. The polyolefin-based resin composition according to claim 1, wherein the conjugated diene other than farnesene is at least one selected from the group consisting of isoprene, butadiene, and myrcene.

8. A molded body comprising the polyolefin-based resin composition according to claim 1.

9. A composite molded body comprising the polyolefin-based resin composition according to claim 1 and at least one of a dynamic crosslinking type olefin-based thermoplastic elastomer and a vulcanized rubber.

10. The polyolefin-based resin composition according to claim 1, wherein the composition has an MFR value, under conditions at 200° C. and 98 N, of 10 g/10 min or more.

11. The polyolefin-based resin composition according to claim 1, wherein the mass ratio of the polyolefin-based resin (B) and the hydrogenated block copolymer (A) [{polyolefin-based resin (B)}/{hydrogenated block copolymer (A)}] is from 55/45 to 90/10.

* * * * *